(No Model.) 2 Sheets—Sheet 1.
R. C. DE LA HUNT.
MEASURING DEVICE AND REGISTER.
No. 563,711. Patented July 7, 1896.
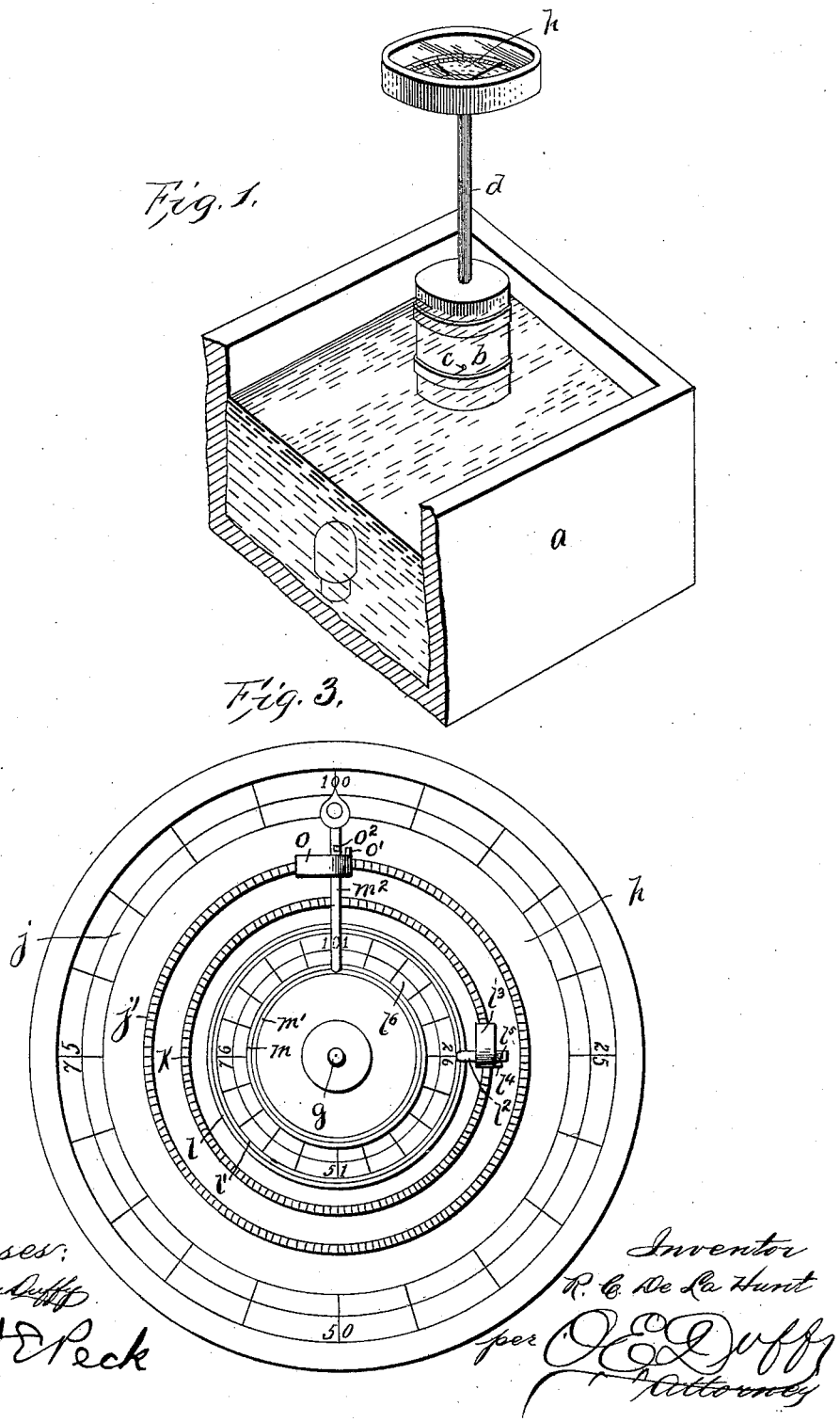

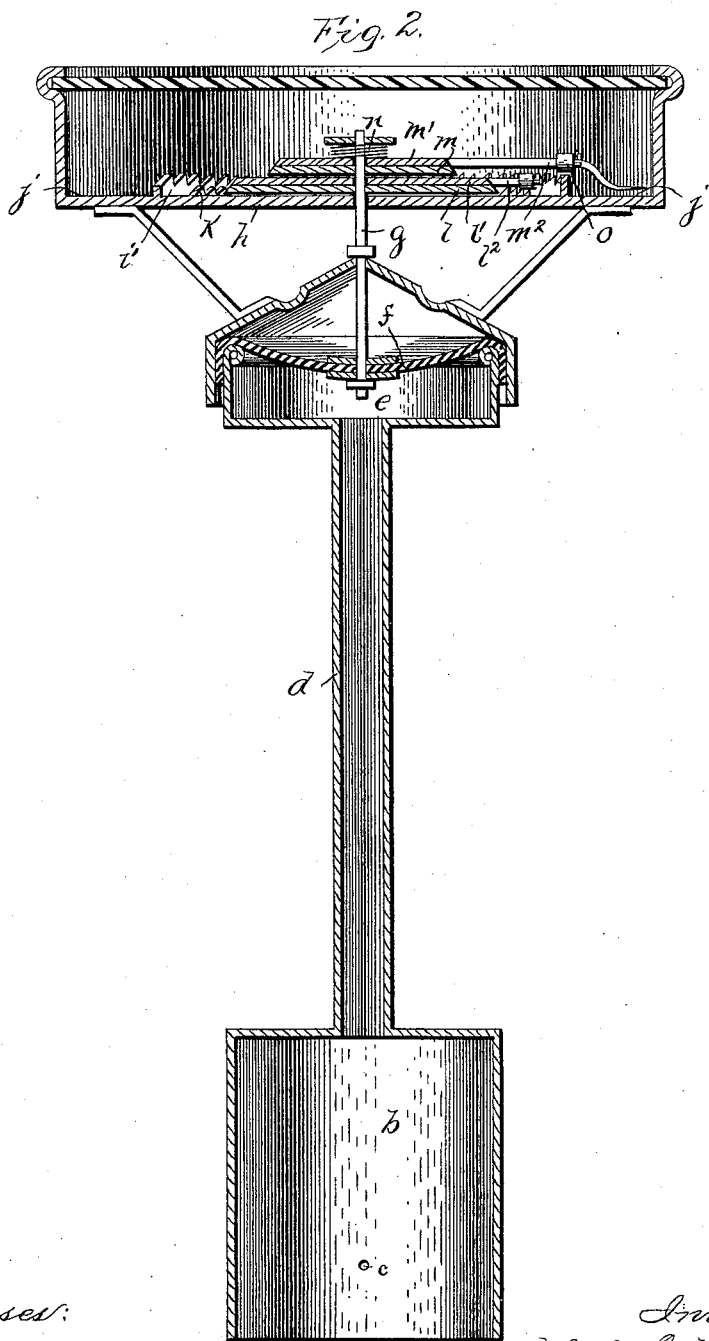

UNITED STATES PATENT OFFICE.

REVERDY C. DE LA HUNT, OF CEDAR RAPIDS, IOWA.

MEASURING DEVICE AND REGISTER.

SPECIFICATION forming part of Letters Patent No. 563,711, dated July 7, 1896.

Application filed June 6, 1895. Serial No. 551,882. (No model.)

*To all whom it may concern:*

Be it known that I, REVERDY C. DE LA HUNT, of Cedar Rapids, in the county of Linn and State of Iowa, have invented certain new and useful Improvements in Measuring Devices and Registers; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to certain improvements in measuring devices and registers.

The object of the invention is to provide a simple, durable, accurate, and effective registering mechanism to indicate and register the number of times a liquid vessel is filled or emptied.

A further object of the invention is to provide an improved effective mechanism for registering every time a vessel is emptied of liquid.

A further object of the invention is to provide an improved device for registering each time a vessel is emptied of liquid by air compressed in a chamber where the vessel is filled and released when the vessel is emptied and registering mechanism operated by such expansion and compression of the air.

The invention consists in certain novel features of construction and in combinations and arrangements of parts more fully and particularly pointed out and described hereinafter.

Referring to the accompanying drawings, Figure 1 is a general perspective view showing a flush-tank provided with an indicating device embodying my invention. Fig. 2 is a vertical longitudinal section of the indicating device and operating means with air-chambers, the diaphragm shown in its normal contracted position as when the air-pressure is normal. Fig. 3 is a top plan view of the register.

In the drawings, $a$ is any suitable liquid vessel, here shown as a flush-tank.

$b$ is an inverted air cup or chamber, closed except at the bottom, and secured in the liquid vessel near the upper part thereof with its lower end below the normal high-water line, so that when the vessel is filled with water the air will be compressed in said chamber, and when the vessel is emptied the lower open end of the chamber is opened to the atmosphere and the air-pressure released therein. This air-chamber can be provided with a small relief-opening $c$, provided with a check-valve.

$d$ is an air-pipe extending up from air-chamber $b$ and at its upper end opening into air-chamber $e$. This chamber $e$ contains a vertically-movable flexible diaphragm $f$, having the vertical rod $g$ secured to and extending upwardly therefrom loosely through the top of said chamber and loosely through the center of the horizontal dial-plate $h$, supported on the chamber.

It will be observed that any inrush or compression of air in the air-chambers will force up the diaphragm and its attached rod and thereby operate the register hereinafter set forth.

The dial-plate has an outer circular scale $j$, preferably divided into one hundred divisions, and a corresponding concentric rack $j'$, within the same, and formed, preferably, by a vertical circular flange having its upper edge formed into the same number of ratchet-teeth as there are divisions in said scale. Each ratchet-tooth has the long upward and forward incline ending in the abrupt shoulder.

$k$ is an inner concentric rack, preferably divided into one hundred and one ratchet-teeth and formed usually the same as the outer rack, just described. $l$ is a plate above the dial and rigid with said rod moving with the diaphragm. $l'$ is a disk loose on said rod and resting and free to turn on said plate or disk $l$. $m$ is a disk above and out of contact with disk $l'$ and rigid with said rod, and $m'$ is a disk loose on the rod and free to turn above disk $m$. $n$ is a coiled spring bearing on the top plate $m'$ to yieldingly hold it in position. This top disk has a rigid radial arm $m^2$, extending therefrom over the under disks and the racks, with its outer end forming a pointer on the outer scale. $o$ is a vertically-swinging pawl mounted on said arm to mesh with the rack $j'$ and thereby rotate the disk $m'$ and said arm step by step from ratchet-tooth to ratchet-tooth.

$o'$ is a lug from the pawl, arranged beneath the lug $o^2$ from the arm $m^2$, so as to limit the downward swing of the pawl by gravity when raised from the rack, so that the pawl will not skip a tooth of the rack.

The disk $l'$ has a corresponding radial arm $l^2$ with a similar vertically-swinging pawl $l^3$ to mesh with the rack $k$ and feed around the disk $l'$ step by step. This pawl has the stop-lugs $l^4$ $l^5$ to limit its downward swing.

A scale $l^6$, corresponding in divisions to rack $k$, is formed on the upper face of the disk $l'$, and over which the arm from disk $m'$ passes and by which the scale $l^6$ is read.

The scale $l^6$ indicates the number of complete revolutions of disk $m'$, and the scale $j$ indicates the number of steps or teeth traversed by the disk $m'$ in the particular revolution.

When the liquid vessel is filled with water, a body of air is compressed in the lower inverted air-chamber, and, the pressure being communicated to the diaphragm, (any well-known equivalent could be used in place of the diaphragm,) forces up the diaphragm and its rod and the series of disks above the dial. When the disks and their arms carrying the pawls drop, so as to come down on the next succeeding ratchet-teeth, respectively, and there as the parts assume their normal positions, the disks are rotated the distance of one tooth each. In this way each filling, and consequently emptying, of the liquid-tank is accurately registered by a most simple, effective, durable, and automatic means.

The outer scale indicates the number of times the tank has been filled up to one hundred, and then, as the inner scale has one hundred and one divisions, each rotation of the disk $l'$ and disk $m'$ causes the disk $l'$ to move over one space more than the disk $m'$, and hence indicates it beneath the arm of disk $m'$, as shown in Fig. 3, where three complete revolutions of the disk $m'$ is indicated, both disks having originally started to move around from the "100" and "101" marks, respectively.

I do not limit myself to the exact arrangements and positions of the parts shown, nor to the precise register-rotating means, as other devices can be employed and operated by compressed air.

This device can be employed for many purposes and in many connections to register amount of liquid passing through a given tank or vessel.

It is evident that various changes might be made in the forms, constructions, and arrangements of the parts described without departing from the spirit and scope of my invention. Hence I do not wish to limit myself to the exact construction herein set forth, but consider myself entitled to all such changes as fall within the spirit and scope of my invention.

What I claim is—

1. A liquid-tank, in combination with an air vessel therein having its lower open end arranged below the plane of the high-water mark of said tank and above the plane of the low-water line, a movable body subjected to and controlled by the air-pressure in said chamber, a register carried by said chamber, and operating connections between said body and the register arranged to indicate the number of times the tank is filled or emptied, substantially as described.

2. A water vessel, in combination with an air-chamber therein having its lower open end arranged below the plane of the high-water line in said vessel, an air-conduit from said chamber, a flexible diaphragm extending across the same to be distended at every filling of the water vessel, a register, and a rod from the diaphragm to and actuating the register, substantially as described.

3. In a device of the character described, an air-chamber, a movable body therein controlled by the fluctuations of air-pressure in said chamber, a horizontal dial, a finger movable horizontally over the same, a rack and a pawl and a vertical reciprocatory connection from said body and controlling and actuating said finger by means of the rack and pawl, substantially as described.

4. A register comprising a dial-plate having a circular rack thereon, a reciprocating rod passing centrally through the dial, a disk moving vertically with the rod and rotating thereon and having a vertically-swinging pawl acting substantially as described.

5. A horizontally-disposed dial-plate, having two concentric series of ratchet-racks, one rack provided with one more tooth than the other, a central reciprocatory rod, two disks moving vertically with the rod and turnable independently thereof and each provided with a radial arm having a pawl to engage one of the racks, and operate substantially as described.

6. A liquid-tank, in combination with an air-chamber secured therein with an open bottom below the plane of the high-water line, an air-tube extending up from said chamber, a flexible diaphragm across said tube, a register carried by the tube comprising a dial and finger, and a reciprocatory rod from the diaphragm connected to operate the moving part of the register, substantially as described.

7. The combination of a water-tank, with an air-chamber secured in the tank with its lower open end below the plane of the high-water line of the tank and above the low-water line thereof, said chamber having an upward extension, a diaphragm across the same, a horizontal dial on the upper end of said extension having circular racks and scales, the rod secured to the diaphragm and extending through the dial and having the turnable fingers and pawls, substantially as described.

In testimony that I claim the foregoing as my own I affix my signature in presence of two witnesses.

REVERDY C. DE LA HUNT. [L. S.]

Witnesses:
ROBERT I. SAFELY,
E. M. FRAZER.